United States Patent

[11] 3,622,651

[72] Inventor Joseph Anthony Vasta
Woodbury, N.J.
[21] Appl. No. 881,278
[22] Filed Dec. 1, 1969
[45] Patented Nov. 23, 1971
[73] Assignee E. I. du Pont de Nemours and Company
Wilmington, Del.
Continuation-in-part of application Ser. No.
811,196, Mar. 27, 1969, now abandoned.
This application Dec. 1, 1969, Ser. No.
881,278

[54] NOVEL POLYMER HAVING PENDENT ESTER GROUPS FOR LOW TEMPERATURE BAKE COATINGS
22 Claims, No Drawings

[52] U.S. Cl.................................................. 260/856,
117/124 E, 117/132 BF, 117/132 C, 117/138.8 A,
117/138.8 E, 117/138.8 UA, 117/148, 117/161
UC, 260/31.2 R, 260/31.2 N, 260/31.2 T,
260/32.8 R, 260/32.8 N, 260/33.6 UA, 260/38,
260/39 R, 260/39 P, 260/39 M, 260/39 SP, 260/41
A, 260/41 B, 260/41 C, 260/78.5 E, 260/78.5 T,
260/844, 260/851, 260/855
[51] Int. Cl......................................................... C08f 15/34
[50] Field of Search............................................ 260/78.5 E,
78.5 T, 844, 851, 855, 856

[56] References Cited
UNITED STATES PATENTS
3,002,959 10/1961 Hicks........................ 260/88.1
3,330,814 7/1967 Vasta........................ 260/844
3,366,706 1/1968 Vasta........................ 260/78.5
3,367,992 2/1968 Bearden..................... 260/78.5
3,376,271 4/1968 Masters et al............. 260/78.5
3,376,272 4/1968 Masters et al............. 260/78.5
3,427,291 2/1969 Vasta........................ 260/844

Primary Examiner—John C. Bleutge
Attorney—Hilmar L. Fricke

ABSTRACT: A novel polymer useful for forming coating compositions and a process for making this polymer are the subjects of this invention; the novel polymer has a backbone of polymerized ethylenically unsaturated monomers and has attached directly to its backbone ester groups of the following structure

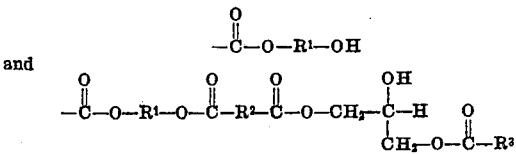

or an isomer thereof, wherein $R^1$, $R^2$ and $R^3$ are hydrocarbon radicals; this novel polymer is particularly useful in forming high quality coating compositions which can be baked into tough, durable films at a relatively low temperature.

NOVEL POLYMER HAVING PENDENT ESTER GROUPS FOR LOW TEMPERATURE BAKE COATINGS

CROSS-REFERENCE TO RELATED APPLICATIONS

This application is a continuation-in-part of the copending U.S. Pat. application Ser. No. 811,196, filed Mar. 27, 1969 now abandoned.

BACKGROUND OF THE INVENTION

This invention relates to a polymer that is useful in forming thermosetting coating compositions and to a process for making this polymer.

Thermosetting coating compositions are well known in the art and have been widely used for autos, appliances, such as refrigerators, stoves, washers and dryers, air conditioners and the like and also for vending machines. Typical thermosetting coating compositions are shown in Frazier et al. U.S. Pat. No. 2,681,897, issued June 22, 1954; Christenson et al., U.S. Pat. No. 2,940,943, issued June 14, 1960; Hicks, U.S. Pat. No. 3,002,959, issued Oct. 3, 1961; Vasta, U.S. Pat. No. 3,330,814, issued July 11, 1967; Vasta, U.S. Pat. No. 3,338,860, issued Aug. 29, 1967; Fisk et al., U.S. Pat. No. 3,365,414, issued Jan. 23, 1968; Vasta, U.S. Pat. No. 3,366,706, issued Jan. 30, 1968; Hicks, U.S. Pat. No. 3,375,227, issued Mar. 26, 1968; Masters et al., U.S. Pat. No. 3,376,271, issued Apr. 2, 1968; and Masters et al., U.S. Pat. No. 3,376,272, issued Apr. 2, 1968. These coating compositions are excellent for many uses, but these compositions generally require a relatively high bake temperature to cure, i.e., to cross-link, the film into a hard, tough, durable coating. Lower temperatures can be used to cure coatings of these prior art compositions, but a catalyst is required which substantially reduces the shelf life and pot life of the composition and reduces properties of the coating, such as hardness.

Each year, industry uses more plastics, such as polystyrene, polypropylene, copolymers of styrene/butadiene/acrylonitrile and the like, on appliances, vending machines and on autos. However, these plastic materials deform at the temperatures (120° C. and higher) required to cure the aforementioned thermosetting coating compositions. The conventional low-temperature bake finishes have been either lacquers, such as nitrocellulose lacquers or acrylic lacquers, or alkyd or epoxy alkyd resins, but these finishes are generally soft, heat-solvent and grease-sensitive and, therefore, are not applicable for applicances or vending machines. It would be very desirable and economical to have a coating composition that cures to a tough, hard, grease and solvent-resistant film at a temperature that would not deform the plastics used by industry. Also, a lower baking temperature would have the obvious advantage of lower operating costs.

The novel polymer of this invention provides a thermosetting coating composition that cures at a relatively low temperature, i.e., 65°–120° C. to form a high quality, tough, durable film and forms a coating composition that has an excellent shelf life. Because of these desirable characteristics, coating compositions formed from the novel polymer of this invention can be used to paint appliances, vending machines, autos and the like and, in particular, the plastic parts of the above equipment can be painted with these coating compositions.

SUMMARY OF THE INVENTION

The novel polymer of this invention has a backbone of polymerized ethylenically unsaturated monomers and has ester groups attached directly to its backbone; these ester groups comprise about 10–75 percent of the total weight of the polymer and consist essentially of Ester Group (A)

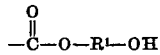

and

Ester Group (B), which is either

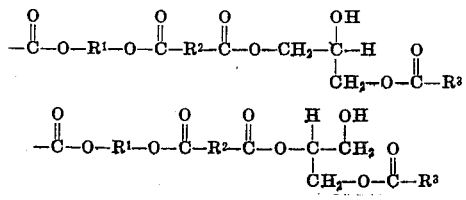

or a mixture of these groups;

wherein the molar ratio of Ester Group (A) to Ester Group (B) is from about 1:1.5 to 1:2.5;

and wherein $R^1$ is a saturated hydrocarbon radical having 2–10 carbon atoms, $R^2$ is selected from the group consisting of alkylene, vinylene, aromatic, carbocylic and heterocyclic radicals, and $R^3$ is selected from the group consisting of a saturated aliphatic hydrocarbon radical having one to 26 carbon atoms and an ethylenically unsaturated aliphatic hydrocarbon radical having 12 to 18 carbon atoms.

DESCRIPTION OF THE INVENTION

A wide variety of ethylenically unsaturated monomers can be used to prepare the backbone of the polymer of this invention. Typical monomers that can be used for the backbone are, for example, vinyl chloride, vinylidene chloride, olefins, such as ethylene, propylene and the like; vinyl acetate, conjugated dienes having four to 10 carbon atoms, such as butadiene; aromatic hydrocarbons having vinylene groups, such as styrene, alkyl substituted styrene, such as α-methyl styrene; alkyl maleate, such as dibutyl maleate; vinyl pyrrolidone; acrylic esters, such as acrylonitrile; esters of methacrylic acid and acrylic acid, preferably alkyl esters having one to 12 carbon atoms in the alkyl group, such as methyl methacrylate, ethyl methacrylate, propyl methacrylate, butyl methacrylate, hexyl methacrylate, 2-ethylhexyl methacrylate, lauryl methacrylate and the like, methyl acrylate, ethyl acrylate, propyl acrylate, butyl acrylate, hexyl acrylate, lauryl acrylate and the like or mixtures of these monomers. Small amounts of ethylenically unsaturated carboxylic acids can also be used in the backbone, such as acrylic acid, methacrylic acid, crotonic acid, itaconic acid, maleic acid and the like.

Particularly useful monomers or combinations of monomers which form the backbone of high quality polymers of this invention are, for example, styrene, methyl methacrylate, butyl methacrylate, ethyl acrylate, acrylonitrile and vinyl pyrrolidone.

Ester Group (A) of the novel polymer of this invention is provided by a hydroxyalkyl substituted vinyl addition monomer, such as hydroxyalkyl methacrylate, a hydroxyalkyl acrylate, a hydroxyalkyl maleate, hydroxyalkyl itaconate, or a mixture of these in which the alkyl group contains two to 10 carbon atoms. The hydroxyalkyl monomer is polymerized with the aforementioned backbone monomers.

Preferred hydroxyalkyl monomers used for forming the polymer of this invention are, for example, hydroxyethyl methacrylate, hydroxypropyl methacrylate, hydroxybutyl methacrylate, hydroxyoctyl methacrylate, hydroxyethyl acrylate, hydroxypropyl acrylate, hydroxybutyl acrylate, hydroxyoctyl acrylate and the like. Preferred are hydroxyalkyl methacrylates or acrylates in which the alkyl groups contain two to four carbon atoms.

Ester Group (B) is the esterification product of the aforementioned hydroxyalkyl monomers, an anhydride of a dicarboxylic acid and a glycidyl ester. This ester group is polymerized into the polymer backbone through the ethylenic unsaturation of the aforementioned hydroxyalkyl monomers.

The anhydride used for forming Ester Group (B) has the formula

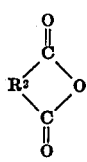

wherein $R^2$ is either alkylene, vinylene, aromatic, carbocyclic or a heterocyclic radical. The anhydride reacts with the hydroxyalkyl monomer and also reacts with the glycidyl ester to form Group (B).

Anhydrides useful in this invention in which $R^2$ is an alkylene group are formed from dicarboxylic acids of the general formula $(CH_2)_n(COOH)_2$ where $n$ is from two to 10. Typical dicarboxylic acids of this group are glutaric, adipic, pimelic, succinic acids and the like. The preferred is an anhydride of succinic acid.

Useful anhydrides in which $R^2$ is a vinylene group are derived from dicarboxylic acids of the general formula

wherein $n$ is from four to 10. Typical dicarboxylic acids of this group are maleic and itaconic acids.

Another group of useful anhydrides are derived from dibasic aromatic acids, such as phthalic acid, uvitic acid and cumidinic acid. Often it is desirable to use a halogen substituted anhydride of one of the above aromatic dicarboxylic acids, such as tetrabromo phthalic anhydride. Halogen substituted anhydrides in which the halogen substitutent is either chlorine, bromine or fluorine are particularly useful in forming fire retardant coating compositions.

Anhydrides in which $R^2$ is a carbocyclic radical are useful, such as hexahydrophthalic anhydride, which has the following formula

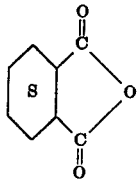

or tetrahydrophthalic anhydride which has the following formula

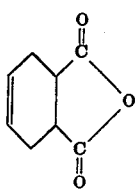

Anhydrides in which $R^2$ is a heterocyclic radical are also useful. One particularly useful compound has the general formula:

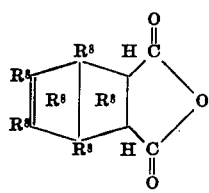

wherein $R^8$ is either chlorine, bromine or fluorine. The preferred compound is chlorendic anhydride in which $R^8$ is chlorine.

The glycidyl ester used for forming Ester Group (B) has the formula

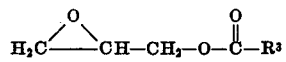

where $R^3$ is a saturated aliphatic hydrocarbon group containing one to 26 carbon atoms, or $R^3$ is an ethylenically unsaturated aliphatic hydrocarbon radical of 12-18 carbon atoms derived from a drying oil fatty acid.

Preferred for use because of the quality of the product obtained are esters where $R^3$ is a tertiary saturated aliphatic hydrocarbon group of the structure

where $R^4$ is $—CH_3$ and $R^5$ and $R^6$ are alkyl groups of one to 12 carbon atoms.

One particularly preferred glycidyl ester of this group because it imparts acid and alkali resistance to the final product is a mixed glycidyl ester described in U.S. Pat. No. 3,275,583, issued Sept. 27, 1966, and is manufactured and sold by the Shell Chemical Company as "Cardura" E ester. This glycidyl ester is of synthetic tertiary carboxylic acid and has the general formula

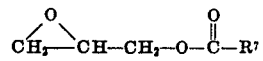

where $R^7$ is a tertiary aliphatic hydrocarbon group of eight to 10 carbon atoms.

When a coating composition formed from the novel polymer of this invention is to be air dried, $R^3$ is an ethylenically unsaturated aliphatic hydrocarbon radical of 12-18 carbon atoms. This glycidyl ester is obtained by esterifying the acid chloride of one of the well known drying oil fatty acids, such as oleic acid, linoleic acid, linolenic acid, oleostearic acid and ricinoleic acid with glycidol. These acids are commonly found in tung oil, linseed oil, dehydrated castor oil and soya oil.

The preferred method for forming the above unsaturated glycidyl esters is to react the sodium salt of the fatty acid with epichlorohydrin. The reaction is as follows:

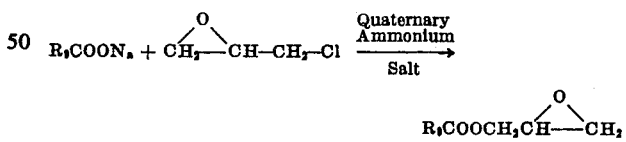

where $R_9$ is from one of the aforementioned drying oil fatty acids.

Preferably, the novel polymer of this invention has 30 to 60 percent of its total weight contributed by Ester Group (A) and (B). Also, these groups are present in the polymer at a molar ratio of Ester Group (A) to Ester Group (B) of about 1:1.5 to about 1:2.5, and preferably, in a ratio of about 1:2.

One method for preparing the novel polymer of this invention is to first form Ester Group (B) by reacting in about an equal molar ratio the above hydroxyalkyl monomers, the anhydride and the glycidyl ester. This esterification product is then reacted with the backbone monomers and the hydroxyalkyl monomers, which form Ester Group (A), to form the novel polymer of this invention.

As a typical example, a hydroxyalkyl acrylate, aromatic anhydride and a glycidyl ester are charged into a reaction vessel with a suitable solvent, such as toluene, xylene, acetone or an aromatic solvent and the mixture is heated to its reflux temperature, which is about 80° to 200° C., for about 30 minutes to 3 hours. The backbone constituents of the novel polymer,

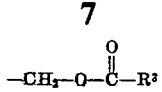

but $R^{10}$ or $R^{11}$ must be H and $R^{10}$ and $R^{11}$ must be different from each other and $R^1$, $R^2$ and $R^3$ are the same groups as previously defined in this specification.

The following examples illustrate the invention. All quantities are on a weight basis unless otherwise indicated.

EXAMPLE 1

A polymer solution is formed by reacting the following ingredients:

|  | Parts by weight |
|---|---|
| Portion 1: | |
| Xylol | 415.39 |
| Hydroxyethyl acrylate | 218.50 |
| Phthalic anhydride | 269.50 |
| "Cardura" E ester (a mixed ester described in U.S. Pat. 3,275,583, issued September 27, 1966, and is a glycidyl ester of a synthetic tertiary carboxylic acid of the formula: | |
| $CH_2\!-\!\!\overset{O}{\diagdown}\!\!CH\!-\!CH_2\!-\!O\!-\!\overset{O}{\overset{\|}{C}}\!-\!R$ | |
| where R is a tertiary aliphatic hydrocarbon group of 8–10 carbon atoms) | 481.25 |
| Portion 2: Xylol | 621.15 |
| Portion 3: | |
| Styrene | 567.88 |
| Methyl methacrylate | 288.74 |
| Hydroxyethyl acrylate | 99.13 |
| Tertiary butyl peroxide | 17.33 |
| Portion 4: | |
| Xylol | 363.13 |
| Cellosolve acetate | 158.00 |
| Total | 3,500.00 |

Portion 1 is charged into a reactor equipped with a reflux condenser and is heated to a reflux temperature and is held at this temperature for about 1 hour. Portion 2 is then added and the mixture is heated to its reflux temperature. Portion 3 is premixed and slowly added over a 3-hour period while maintaining the reflux condition and then the reaction mixture is held at the reflux temperature for an additional 3 hours. The heat is removed from the reaction vessel and Portion 4 is added.

The resulting polymer solution has a solids content of about 55 percent and a Gardner Holdt viscosity of about X and an acid number less than 10. The polymer is the copolymerization and esterification product of the following reactants:

|  | Parts By Weight |
|---|---|
| Styrene | 29.5 |
| Methyl methacrylate | 15.0 |
| Hydroxyethyl acrylate | 16.5 |
| Phthalic anhydride | 14.0 |
| "Cardura" E ester | 25.0 |
| Total | 100.0 |

A paint is formulated by mixing the following ingredients:

|  | Parts By Weight |
|---|---|
| Portion 1 | |
| Polymer solution of example 1 (55% polymer solids) | 600 |
| Xylol | 300 |
| Butanol | 300 |
| Titanium dioxide pigment—(rutile, prepared by the chloride process) | 1,800 |
| Total | 3,000 |

The above ingredients are premixed and charged into a conventional sand grinding mill and ground to about a 0.5-mil fineness.

A thermosetting paint composition is formed by mixing the following ingredients:

|  | Parts By Weight |
|---|---|
| Polymer solution of example 1 (55% solids) | 367.92 |
| Formula 1 Mill Base | 500.00 |
| "Cymel" 301 (hexamethoxymethoyl melamine resin) | 45.00 |
| Xylol | 37.83 |
| Butanol | 37.85 |
| Catalyst solution (20% by weight p-toluene sulfonic acid in isopropanol) | 11.40 |
| Total | 1,000.00 |

The resulting paint has a pigment to binder ratio of 100:100, a nonvolatile solids content of 60 percent, the binder composition of 85:15 of polymer to melamine resin, and a viscosity of 40 seconds using a No. 10 Parlin Cup.

The paint is reduced to a hand spray viscosity of 30 seconds No. 2 Zahn Cup using about 10 percent xylol. This paint is sprayed on to a treated steel substrate, treated with zinc phosphate and baked for 30 minutes at 95° C. The baked paint has excellent resistance to solvents, such as methylethyl ketone, and is scratch resistant, e.g., a 5H pencil will not damage or mar the finish.

Another highly stable thermosetting paint composition is formed by blending the following ingredients:

|  | Parts By Weight |
|---|---|
| Formula 1 Mill Base | 516.68 |
| Polymer solution of example 1 (55% solids) | 234.86 |
| Polyester solution (60% solids of a polyester of phthalic anhydride/maleic anhydride/trimethylol propane/ethylene glycol/"Cardura" E ester weight ratio of 41/5/17/6/30 in xylol). | 129.18 |
| "Cymel" 301 (described above) | 46.50 |
| Xylol | 31.97 |
| Butanol | 31.98 |
| Catalyst solution (described above) | 8.83 |
| Total | 1,000.00 |

The resulting paint has a pigment to binder ratio of 100:100, a binder composition of 60/25/15 polymer of example 1/polyester/"Cymel" 301 and a viscosity of 40 seconds, No. 10 Parlin Cup. Samples of the above paint composition were placed in an oven at 120° F. and held at this temperature for 1 month. The resulting viscosity of the paint after exposure was about 70 sec. No. 10 Parlin Cup, which is a viscosity increase acceptable for normal paints.

EXAMPLE 2

|  | Parts By Weight |
|---|---|
| Portion 1 | |
| Xylol | 1,036.70 |
| Phthalic anhydride | 260.05 |
| Portion 2 | |
| Butyl methacrylate | 866.25 |
| Hydroxyethyl acrylate | 317.45 |
| "Cardura" E ester (described in example 1) | 481.25 |
| Ditertiary butyl peroxide | 17.50 |
| Portion 3 | |
| Xylol | 363.30 |
| Cellosolve acetate | 157.50 |
| Total | 3,500.00 |

Portion 1 is charged into a reaction vessel equipped with a reflux condenser and heated to its reflux temperature. Portion 2 is premixed and slowly added over a 2-hour period while maintaining the reflux temperature of the reaction mixture and the reaction mixture is held at its reflux temperature for an additional five hours. Portion 3 is premixed and added to the reaction mixture after the heat has been removed.

The resulting polymer solution has a polymer solids content of 55 percent, an acid number of about 3, a Gardner Holdt viscosity of about F. The polymer is a copolymerization and esterificaton product of the following reactants:

such as styrene/methyl methacrylate and a hydroxalkyl acrylate with a suitable polymerization catalyst, such as tertiary butyl peroxide, are then slowly added over a 1-4 hour period. The reaction mixture is heated to its reflux temperature which is about 80° to 200° C. for about 30 minutes to 5 hours, preferably 2-4 hours until a polymer is formed that has the desired molecular weight, which is determined by the relative viscosity as described below. Additional solvent may then be added to dilute the polymer solution.

If the reaction rates of the monomer components used to form the novel polymer of the invention are suitable, all of the monomers can be charged into a reaction vessel with a suitable solvent and polymerization catalyst and heated to the reflux temperature which is about 80° to 200° C. for 60 minutes to 5 hours.

Another method of preparing the novel polymer of this invention is to charge the anhydride, for example, phthalic anhydride, into a reaction vessel with a suitable solvent and heat the mixture for about 30 minutes to effect solution of the anhydride. The other monomer constituents with a suitable polymerization catalyst are then slowly added over a 1-4 hour period into the reaction vessel while maintaining a reflux temperature which is about 80°-200° C. After the above ingredients have been added, the reaction mixture is maintained at its reflux temperature for an additional 30 minutes to about 5 hours.

Suitable solvents which are used to prepare the novel polymer of this invention are toluene, xylene, butyl acetate, acetone, methylisobutyl ketone, methylethyl ketone, and other aliphatic cycloaliphatic and aromatic hydrocarbons, esters, ethers, ketones and other solvents which are nonreactive with the monomers used to form the novel polymer of this invention such as are conventionally used in coating compositions.

Suitable polymerization catalysts that are used in the process to prepare the novel polymer of this invention are tertiary butyl peroxide, cumene hydroperoxide, axobisisobutyronitrile and the like. To prepare the Ester Group (B) esterification catalysts, such as quaternary bases or salts as benzyltrimethylammonium hydroxide, benzyltrimethylammonium chloride, octadecyltrimethylammonium chloride, or an amine, such as triethylamine, can be used.

The novel polymer preferably has a relative viscosity of 0.9 to 1.4. The "relative viscosity" is the value obtained by dividing the efflux time of a solution of the polymer by the efflux time of the solvent used to form the above polymer solution. The efflux times are measured according to the procedure of ASTM-D-445-46-T, Method B, using as the polymer solution 0.25 grams of the polymer in 50 cubic centimeters of ethylene dichloride as the solvent. The efflux times are measured at 25° C. in a standard apparatus, sold under the designation of a modified Ostwald Viscometer.

The polymer solution resulting from the aforementioned process is suitable for direct use in the preparation of coating compositions. If the pure polymer is desired, it can be obtained by simply stripping the solvent from the solution, leaving behind a solid mass whose physical properties can range from resinuous to crystalline, depending on the monomers and the polymerization conditions used.

Thermosetting coating compositions are prepared from a solution of the novel polymer of this invention by blending the polymer solution with a thermosetting resin and a strong acid catalyst.

A typical coating composition contains about 10-60 percent by weight of a resin blend and a solvent for the resin blend. Solvents which commonly used are high solvency hydrocarbons, alcohols, esters, ketones or ethers and if desired, plasticizers may be added to the coating. The resin blend of the coating composition contains about 60-90 percent by weight, based on the weight of the resin blend of the novel polymer of this invention; about 40-10 percent by weight, based on the weight of the resin blend, of a thermosetting resin and about 0.5-2 percent by weight, based on the weight of the resin blend, of a strong acid catalyst.

The thermosetting resins used to form the novel coating composition of this invention are phenol/formaldehyde, urea/formaldehyde, melamine/formaldehyde, alkylated malamine/formaldehyde resins and benzoguanamine/formaldehyde resins. One particularly useful group of resins are the alkylated melamine/formaldehyde resins and urea/formaldehyde. These preferred alkylated melamine/formaldehyde resins have one to four carbon atoms in the alkyl group and are those that are well known in the art. These resins are prepared by conventional techniques in which a lower alkyl alcohol, such as methanol, butanol, isobutanol, propanol, isopropanol, ethanol and the like, is reacted with the melamine/formaldehyde resin to provide pendent alkoxy groups. One preferred melamine resin used in this invention, because of its availability and since it forms a high quality coating composition, is a methylated melamine/formaldehyde.

Another particularly preferred thermosetting resin used with the novel polymer of this invention which gives a high quality coating composition is hexamethoxymethylol melamine which is sold under the trade name "Cymel" 300 and 301.

An acid catalyst is used in the cure of the novel coating composition of this invention. Typical strong acid catalyst are sulfuric acid, sulfonic acid, p-toluene sulfonic acid, naphthalene sulfonic acid, hydrochloric acid, phosphoric acid, oxalic acid, citric acid and mixtures thereof.

For most uses, the novel thermosetting coating composition formed from novel polymers of this invention is pigmented. The pigment to binder ratio can vary from about one to 150, depending on the pigment used. By binder, it is meant the film-forming materials in the coating composition. Typical pigments which can be used are metallic oxides, preferably titanium dioxide, zinc oxide, and the like, metal hydroxides, metal flakes, chromates, such as lead chromate, sulfides, sulfates, carbonates, carbon black, silica, talc, china clay, organic dyes and lead, iron blues, organic reds, maroons, and the like, organic dyes and lakes, etc.

The pigments are introduced into the coating composition by first forming a mill base by conventional sand-grinding or ball-milling techniques, and then blending the mill base with the film-forming resins as shown in the following examples.

The novel coating compositions of this invention can be applied to a variety of substrates, for example, metal, wood, glass, plastics, such as polypropylene, polystyrene, copolymers of styrene, such as styrene/butadiene/acrylonitrile and the like, by any of the usual application methods, such as spraying, dipping, brushing, flow-coating and the like. These coatings are baked at a relatively low temperature of about 65°-120° C. for about 15 minutes to 2 hours. The resulting coating is about 1-5 mils thick, preferably 1-3 mils thick and can be rubbed or polished in accordance with conventional techniques, if desired, to improve smoothness or apparent gloss or both. Surprisingly, even at this relatively low temperature, the novel coating composition of the invention give a hard, durable, scratch resistant and grease resistant, glossy coating which is suitable for auto bodies, truck bodies, appliances, vending machines, outdoor equipment and the like.

Preferably, the novel coating composition of this invention is applied over a suitable treated or primed metal substrate. For example, steel substrates treated with zinc phosphate, can be used. Also, metal substrates coated with typical alkyd primers or epoxy primers pigmented with iron oxide, carbon black, titanium dioxide and the like can be used. Also, the novel composition can be used directly over galvanized steel to form a durable coating.

Ester Group (B) of the novel polymer of this invention can also be described as

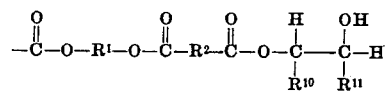

wherein $R^{10}$ and $R^{11}$ are either H or

| | Parts By Weight |
|---|---|
| Butyl methacrylate | 45.00 |
| Hydroxyethyl acrylate | 16.5 |
| Phthalic anhydride | 13.5 |
| "Cardura" E ester | 25.0 |
| Total | 100.0 |

A thermosetting paint composition is formed by mixing the following ingredients:

| | Parts By Weight |
|---|---|
| Polymer solution of example 2(55% polymer solids) | 367.92 |
| Formula 1 Mill Base | 500.00 |
| "Cymel" 301 (hexamethoxymethylol melamine resin) | 45.00 |
| Xylol | 37.83 |
| Butanol | 37.85 |
| Catalyst solution (20% by weight p-toluene sulfonic acid in isopropanol) | 11.40 |
| Total | 1,000.00 |

The resulting paint has a pigment to binder ratio of 100:100, a nonvolatile solids content of 60 percent, the binder composition of 85:15 polymer to melamine resin, and a viscosity of 40 seconds using a No. 10 Parlin Cup.

The paint is reduced to a hand spray viscosity of 30 seconds No. 2 Zahn Cup using about 10 percent xylol. This paint is sprayed on to a treated steel substrate, treated with zinc phosphate and baked for 30 minutes at 95° C. The baked paint has excellent resistance to solvents, such as methylethyl ketone, and is scratch resistant, e.g., a 2H pencil will not damage or mar the finish.

EXAMPLE 3

| | Parts By Weight |
|---|---|
| Portion 1 | |
| Xylol | 1,036.70 |
| Tetrahydrophthalic anhydride | 260.05 |
| Portion 2 | |
| Butyl methacrylate | 866.25 |
| Hydroxyethyl acrylate | 317.45 |
| "Cardura" E ester (described in example 1) | 481.25 |
| Cumene hydroperoxide | 17.50 |
| Portion 3 | |
| Xylol | 363.30 |
| Cellosolve acetate | 157.50 |
| Total | 3,500.00 |

Portion 1 is charged into a reaction vessel equipped with a reflux condenser and heated to its reflux temperature. Portion 2 is premixed and slowly added over a 2-hour period while maintaining the reflux temperature of the reaction mixture and the reaction mixture is held at its reflux temperature for an additional 5 hours. Portion 3 is premixed and added to the reaction mixture after the heat has been removed.

The resulting polymer solution has a polymer solids content of 55 percent, an acid number of about 3, a Gardner Holdt viscosity of about F. The polymer is a copolymerization and esterification product of the following reactants:

| | Parts By Weight |
|---|---|
| Butyl methacrylate | 45 |
| Hydroxyethyl acrylate | 16.5 |
| Tetrahydrophthalic anhydride | 13.5 |
| "Cardura" E ester | 25 |
| Total | 100.0 |

A thermosetting paint composition is formed by mixing the following ingredients:

| | Parts By Weight |
|---|---|
| Polymer solution of example 3 (55% solids) | 367.92 |
| Formula 1 Mill Base | 500.00 |
| "Cymel" 301 (hexamethoxylemthylol melamine resin) | 45.00 |
| Xylol | 37.83 |
| Butanol | 37.85 |
| Catalyst solution (20% by weight p-toluene sulfonic acid in isopropanol) | 11.40 |
| Total | 1,000.00 |

The resulting paint has a pigment to binder ratio of 100:100, a nonvolatile solids content of 60 percent, the binder composition of 85:15 of polymer to melamine resin, and a viscosity of 40 seconds using a No. 10 Parlin Cup.

The paint is reduced to a hand-spray viscosity of 30 seconds No. 2 Zahn Cup using about 10 percent xylol. This paint is sprayed on to a treated steel substrate, treated with zinc phosphate and baked for 30 minutes at 95° C. The baked paint has excellent resistance to solvents, such as methylethyl ketone, has excellent adhesion to the metal substrate and is tough and flexible.

EXAMPLE 4

| | Parts By Weight |
|---|---|
| Portion 1 | |
| Toluene | 190 |
| Xylol | 762 |
| Phthalic anhydride | 378 |
| Portion 2 | |
| Methyl methacrylate | 360 |
| Hydroxyethyl acrylate | 396 |
| "Cardura" E ester (described in example 1) | 666 |
| Ditertiary butyl peroxide | 18 |
| Portion 3 | |
| Cellosolve acetate | 230 |
| Total | 3,000 |

Portion 1 is charged into a reaction vessel equipped with a reflux condenser and heated to its reflux temperature. Portion 2 is premixed and slowly added over a 2-hour period while maintaining the reflux temperature of the reaction mixture and the reaction mixture is held at its reflux temperature for an additional 5 hours. Portion 3 is premixed and added to the reaction mixture after the heat has been removed.

The resulting polymer solution has a polymer solids content of 60.25 percent, and acid number of 6.2, a Gardner Holdt viscosity of Y. The polymer is a copolymerizable and esterification product of the following reactants:

| | Parts By Weight |
|---|---|
| Methyl methacrylate | 20 |
| Hydroxyethyl acrylate | 22 |
| Phthalic anhydride | 21 |
| "Cardura" E ester | 37 |
| Total | 100 |

A thermosetting paint composition is formed by mixing the following ingredients:

| | Parts By Weight |
|---|---|
| Polymer solution of example 4 (60.25% solids) | 367.92 |
| Formula 1 Mill Base | 500.00 |
| "Cymel" 301 (hexamethoxymethylol melamine resin) | 45.00 |
| Xylol | 37.83 |
| Butanol | 37.85 |
| Catalyst solution (20% by weight p-toluene sulfonic acid in isopropanol) | 11.40 |
| Total | 1,000.00 |

The resulting paint has a pigment to binder ratio of 100:100, a nonvolatile solids content of 60 percent, the binder composition of 85:15 of polymer to melamine resin, and a viscosity of 40 seconds using a No. 10 Parlin Cup.

The paint is reduced to a hand spray viscosity of 30 seconds No. 2 Zahn Cup using about 10 percent xylol. This paint is sprayed onto a treated steel substrate, treated with zinc phosphate and baked for 30 minutes at 95° C. The baked paint has excellent resistance to solvents, such as methylethyl ketone, and is scratch resistant, e.g., a 2H pencil will not damage or mar the finish.

What is claimed is:

1. A polymer having a backbone of polymerized ethylenically unsaturated monomers and having ester groups attached directly to its backbone, said ester groups comprising about 10 to 75 percent of the total weight of the polymer and consisting essentially of Ester Group (A)

Ester Group (B) selected from the group consisting of

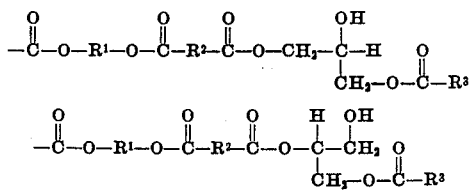

or mixtures thereof, wherein the molar ratio of Ester Group (A) to Ester Group (B) is from about 1:1.5 to 1:2.5;

and wherein $R^1$ is a saturated hydrocarbon radical containing 2–10 carbon atoms;

$R^2$ is selected from the group consisting of alkylene, vinylene, aromatic, carbocyclic and heteroradicals, and $R^3$ is selected from the group consisting of a saturated aliphatic hydrocarbon radical having one to 26 carbon atoms and an ethylenically unsaturated aliphatic hydrocarbon radical having 12 to 18 carbon atoms.

2. The polymer of claim 1 in which the ester groups comprise 30 to 60 percent by weight of the polymer.

3. The polymer of claim 1 in which the polymer backbone consists essentially of polymerized monomers of an aromatic hydrocarbon having vinylene groups, and esters of an $\alpha,\beta$-ethylenically unsaturated carboxylic acid.

4. The polymer of claim 3 in which $R^1$ is a saturated aliphatic hydrocarbon group having 2–4 carbon atoms, $R^2$ is selected from the group consisting of an aromatic radical and a carbocyclic radical, and $R^3$ is tertiary aliphatic hydrocarbon group of eight through ten carbon atoms.

5. The polymer of claim 3 in which the backbone consists essentially of styrene and an acrylic ester selected from the group consisting of an alkyl methacrylate, an alkyl acrylate and mixture thereof in which the alkyl group contains 1–12 carbon atoms; in which $R^1$ is a saturated hydrocarbons group having 2–4 carbon atoms, $R^2$ is an aromatic radical, and $R^3$ is a tertiary hydrocarbon group having eight through ten carbon atoms.

6. The polymer of claim 5 in which the acrylic ester is methyl methacrylate and in which $R^1$ is ethylene and $R^2$ is phenylene.

7. The polymer of claim 1 in which the polymer backbone consists essentially of polymerized monomers of an acrylic ester.

8. The polymer of claim 7 in which the acrylic ester is selected from the group consisting of an alkyl methacrylate, an alkyl acrylate or a mixture thereof, wherein the alkyl group contains 1–12 carbon atoms.

9. The polymer of claim 8 in which $R^1$ is a saturated aliphatic hydrocarbon group having 2–4 carbon atoms, $R^2$ is selected from the group consisting of an aromatic radical and a carbocyclic radical, and $R^3$ is a tertiary aliphatic hydrocarbon group of eight through ten carbon atoms.

10. The polymer of claim 9 in which the backbone consists essentially of butyl methacrylate and $R^1$ is ethylene and $R^2$ is phenylene.

11. The polymer of claim 9 in which the backbone consists essentially of methyl methacrylate and $R^1$ is ethylene and $R^2$ is phenylene 12. The polymer of claim 9 in which the backbone consists essentially of butyl methacrylate and $R^1$ is an ethylene group and $R^2$ is

13. A coating composition 10–60 percent by weight of a resin blend and a solvent for the resin blend in which the resin blend consists essentially of 1. 60–90 percent by weight, based on the weight of the resin blend, of the polymer of claim 1;
2. 40–10 percent by weight, based on the weight of the resin blend, of a thermosetting resin;
3. 0.2–5 percent by weight, based on the weight of the resin blend of a strong acid catalyst.

14. The coating composition of claim 13 containing pigment.

15. The coating composition of claim 14 in which the thermosetting resin is selected from the group consisting of phenol/formaldehyde, urea/formaldehyde, melamine/formaldehyde, an alkylated melamine/formaldehyde, benzoguanamine/formaldehyde and mixtures thereof.

16. The coating composition of claim 14 in which the acid catalyst is selected from the group consisting of sulfuric acid, sulfonic acid, p-toluene sulfonic acid, naphthalene sulfonic acid, hydrochloric acid, phosphoric acid, oxalic acid, citric acid and mixtures thereof.

17. The coating composition of claim 14 comprising 1. a polymer in which the backbone consists essentially of styrene and an acrylic ester selected from the group consisting of an alkyl methacrylate, an alkyl acrylate and a mixture thereof in which the alkyl group contains 1–12 carbon atoms;

in which $R^1$ is a saturated hydrocarbon group having 2–4 carbon atoms, $R^2$ is selected from the group consisting of an aromatic radical and a carbocyclic radical, and $R^3$ is a tertiary hydrocarbon group having eight through ten carbon atoms;

2. a thermosetting resin or hexamethoxymethylol melamine, and
3. an acid catalyst of p-toluene sulfonic acid.

18. The coating composition of claim 17 in which the acrylic ester is methyl methacrylate, $R^1$ is an ethylene radical and $R^2$ is phenylene.

19. The coating composition of claim 14 comprising 1. a polymer in which the backbone consists essentially of an acrylic ester selected from the group consisting of an alkyl methacrylate, an alkyl acrylate and a mixture thereof in which the hydrocarbon group contains 1–12 carbon atoms;

in which $R^1$ is a saturated hydrocarbon group having 2–4 carbon atoms, $R^2$ is selected from the group consisting of an aromatic radical and a carbocyclic radical, and $R^3$ is a tertiary hydrocarbon group having eight through ten carbon atoms;

2. a thermosetting resin of hexamethoxymethylol melamine; and
3. an acid catalyst of p-toluene sulfonic acid.

20. The coating composition of claim 19 in which the acrylic ester is butyl methacrylate, $R^1$ is an ethylene radical and $R^2$ is phenylene.

21. The coating composition of claim 19 in which the acrylic ester is butyl methacrylate, $R^1$ is an ethylene radical, and $R^2$ is

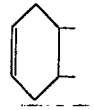

22. The coating composition of claim 19 in which the acrylic ester is methyl methacrylate, $R^1$ is an ethylene radical, and $R^2$ is phenylene.

* * * * *